United States Patent [19]
Chung et al.

[11] Patent Number: 5,689,155
[45] Date of Patent: Nov. 18, 1997

[54] ELECTRONIC STABILIZER HAVING A VARIABLE FREQUENCY SOFT START CIRCUIT

[75] Inventors: Eric Chung, Hsin Tien; Charles Chang, San Chung, both of Taiwan

[73] Assignee: Yao Shung Electronic Co., Ltd., Taipei, Taiwan

[21] Appl. No.: 738,448

[22] Filed: Oct. 25, 1996

[51] Int. Cl.$^6$ ........................................ G05F 1/00
[52] U.S. Cl. .................. 315/199; 315/209 R; 315/278; 315/307; 315/DIG. 4
[58] Field of Search .................... 315/199, 194, 315/246, 247, 225, 209 R, 278, 284, 307, 308, 306, DIG. 2, DIG. 4, DIG. 7, 101, 244

[56] References Cited

U.S. PATENT DOCUMENTS

| | | |
|---|---|---|
| 4,651,060 | 3/1987 | Clark ........................... 315/199 |
| 4,797,599 | 1/1989 | Ference et al. ............... 315/194 |
| 4,994,717 | 2/1991 | Moon ........................... 315/219 |
| 5,140,224 | 8/1992 | Kakitani et al. .............. 315/209 R |
| 5,192,897 | 3/1993 | Vossough et al. ............. 315/308 |
| 5,208,515 | 5/1993 | Lee .............................. 315/225 |
| 5,363,020 | 11/1994 | Chen et al. .................. 315/209 R |
| 5,426,350 | 6/1995 | Lai ............................... 315/244 |

*Primary Examiner*—Robert Pascal
*Assistant Examiner*—Haissa Philogene
*Attorney, Agent, or Firm*—Pro-Techtor International

[57] ABSTRACT

An electronic stabilizer having a variable frequency soft start circuit, said circuit having a secondary coil coupled to a drive transformer of the electronic stabilizer. In the initial period when power is connected, the secondary coil may supply an induced voltage to a capacitor to generate a forward voltage to connect primary transistor to allow an inductance element to parallel the secondary coil to reduce the total inductance. The operating frequency of an LC oscillating circuit of the stabilizer hence increases. Relatively, the energy obtainable by the fluorescent lamp is reduced. The soft start circuit is further provided with a discharge loop of a secondary transistor for discharging of the capacitor to ensure that soft starts may be achieved under any conditions.

7 Claims, 4 Drawing Sheets

ELECTRONIC STABILIZER HAVING A VARIABLE FREQUENCY SOFT START CIRCUIT

BACKGROUND OF THE INVENTION

1. Field of the Invention

The present invention relates generally to an electronic stabilizer, and more particularly to an electronic stabilizer with a variable frequency soft start circuit for prolonging the life of fluorescent lamps.

2. Description of the Prior Art

It has been known that electronic stabilizers have the advantages of high efficiency, high power factor, and low harmonic power. Besides, they do not generate flashes when the lamp is switched on at a high frequency. With conventional electronic stabilizers, damage may easily caused to the fluorescent lamps at the instant of start. This is mainly because, at the instant of start, considerable electric currents will flow into the filament, resulting in damage of the fluorescent lamp.

Recent studies on the development of electronic stabilizers show that soft start techniques have been developed to improve the problem of the tube's being subjected to the impact of electric currents upon start. Such techniques include use of passive elements; and use of a positive temperature coefficient thermistor as a main element in a soft start loop. FIG. 1 shows a prior electronic stabilizer, in which a block 11 is a high frequency switching control loop. At the initial state, the resistance of a fluorescent lamp 12 is high, while a positive temperature coefficient thermistor 10 exhibits low resistance. Therefore, during starting, most of the electric currents will flow via the positive temperature coefficient thermistor 10, and those flowing via the lamp 12 will change with the resistance of the positive temperature coefficient thermistor 10, achieving soft start control. The soft start of the positive temperature coefficient thermistor 10 is easily affected by the environment and ambient temperatures. And such a device may achieve a relatively satisfactory soft start at the first start (the so-called cold start). Besides, the prior positive temperature coefficient thermistor is paralleled to the fluorescent lamp, which may reduce efficiency.

Another prior art is shown in FIG. 2 and is directed to forced control of the conducting time of the positive and negative half cycles of the transistors. FIG. 2 differs from FIG. 1 in that, at the initial starting, starting a control loop 13 at a positive half cycle and starting a control loop 14 at a negative half cycle will achieve forced control of the set conducting time and gradually increase the conducting time based on the time constant of the resistance-capacitance (RC) within each control loop, thus accomplishing control of a soft start of the fluorescent lamp 12. It can be seen that such control requires use of two identical or similar elements and structures in the loop, which is more costly than those consisting of a single circuit. As the above-mentioned circuit includes two independent control elements, it is not easy to obtain a work cycle of exactly 50% for each during mass production. Therefore, one of the transistors may be hotter than the other, which is a potential problem in terms of the stability of the products.

SUMMARY OF THE INVENTION

A primary object of the present invention is to provide a variable frequency type periodic soft start electronic stabilizer the operation and efficiency of which may not be affected by ambient temperatures.

Another object of the present invention is to provide a variable frequency type periodic soft start electronic stabilizer which may always achieve satisfactory soft starts whether it is a first or successive start.

A further object of the present invention is to provide a soft start electronic stabilizer having a variable frequency circuit of a simple structure, in which the transistor elements in the circuit may be each allotted an equal share of work so that the light generated by a fluorescent lamp is stable.

Still another object of the present invention is to provide an electronic stabilizer in which a secondary induced voltage of a transformer to achieve soft starts.

In order to achieve the above-mentioned objects, the present invention provides an electronic stabilizer having a variable frequency soft start circuit, in which a drive transformer drives two secondary coils of opposite polarities to cause two transistors in a high frequency switching control loop to become connected or disconnected respectively at a different time so as to maintain sustained oscillation. A secondary side of the drive transformer is coupled with a secondary coil to provide an induced voltage to a capacitor in a variable frequency soft start circuit during the initial stage of electrical connection, so as to generate a forward voltage to connect a primary transistor, and an inductance element is paralleled to the secondary coil to reduce the total inductance. The operating frequency of an LC oscillating circuit of the stabilizer hence increases. Relatively, the energy obtained by the tube decreases. The soft start circuit further has a discharge loop of a secondary transistor to enable the capacitor to discharge so as to ensure that soft starts may be accomplished under any conditions.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENTS

Figure 1:
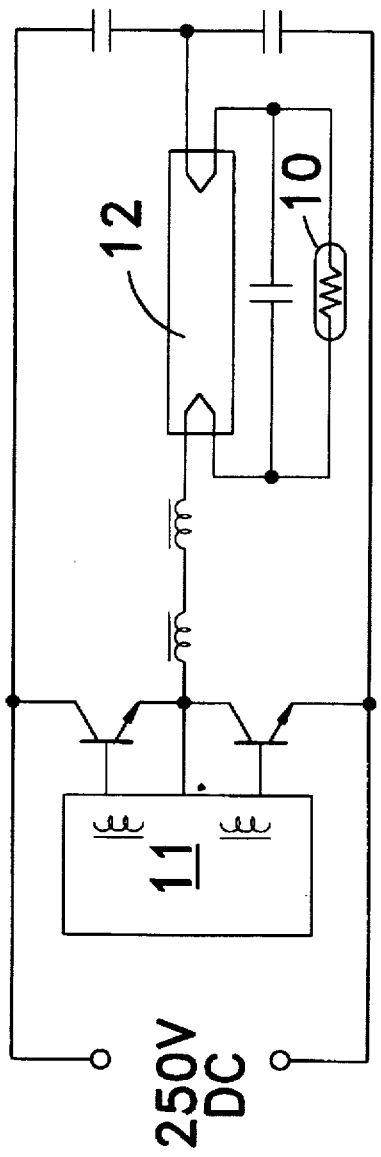
FIG. 1 is a block diagram of a conventional passive type soft start electronic stabilizer.
Figure 2:
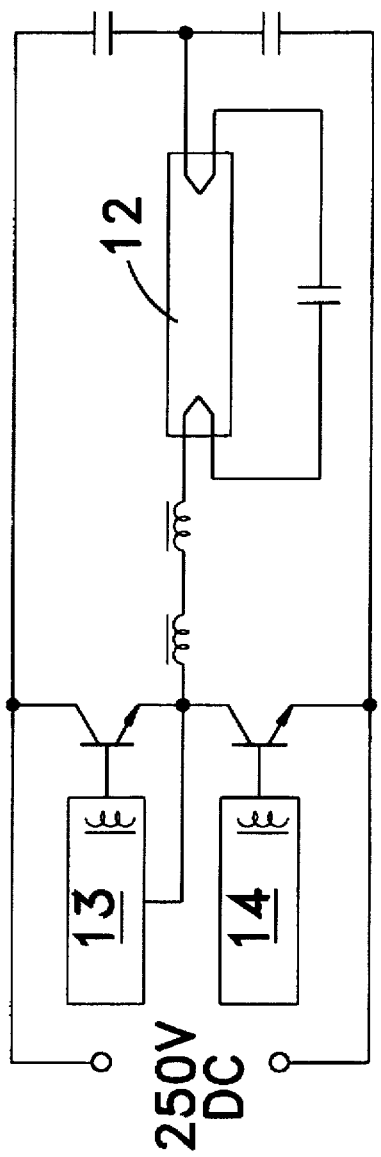
FIG. 2 is a block diagram of a conventional forced type soft start electronic stabilizer.
Figure 3:
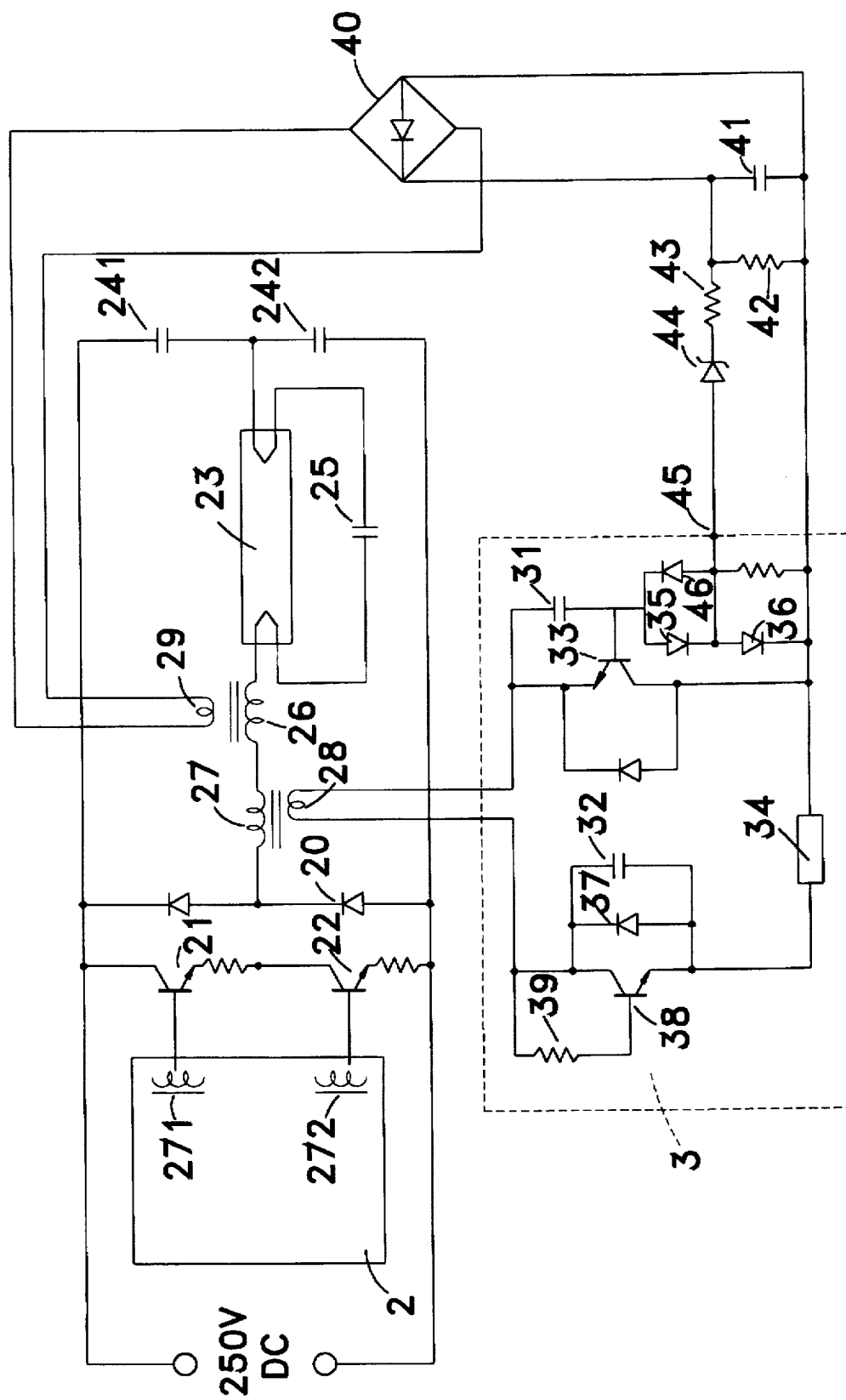
FIG. 3 is a circuit diagram of a variable frequency soft start circuit according to the present invention.

A preferred embodiment of the variable frequency soft start circuit 3 according to the present invention is illustrated in FIG. 3. It is provided to connect to an electronic stabilizer (detailed in FIG. 4) to improve its efficiency in the initial starting period. The circuit 3 comprises a secondary coil 28 coupled to a drive transformer 27 to obtain an induced voltage; and an inductance element such as a beat core 34 paralleled to the secondary coil 28. The circuit 3 further comprises a charge circuit and a discharge circuit, in which the charge circuit has a primary transistor 33 provided at a charging side between the secondary coil 28 and the beat core 34, and a first capacitor 31 connected to a base electrode of the primary transistor 33. In the initial period when a first transistor 21 is connected to charge a fluorescent lamp 23, the first capacitor 31 will immediately obtain an induced voltage and may, before it is fully charged, supply a forward voltage to the primary transistor 33 so that the secondary coil 28 paralleled to the beat core 34 may reduce the total inductance. The operating frequency of the LC oscillating circuit (see FIG. 4) is therefore increased, reducing the amount of energy obtained by the lamp 23, thus accomplishing a soft start. The discharge circuit of the circuit 3 has a secondary transistor 38 provided at a discharging side between the secondary coil 28 and the beat core 34 and forms the discharge loop together with the secondary coil 28, the first capacitor 31 and the beat core 34. The discharge circuit has a plurality of diodes 35, 36, and 37 connected thereto in a series for the discharging of the first capacitor 31.

Figure 4:
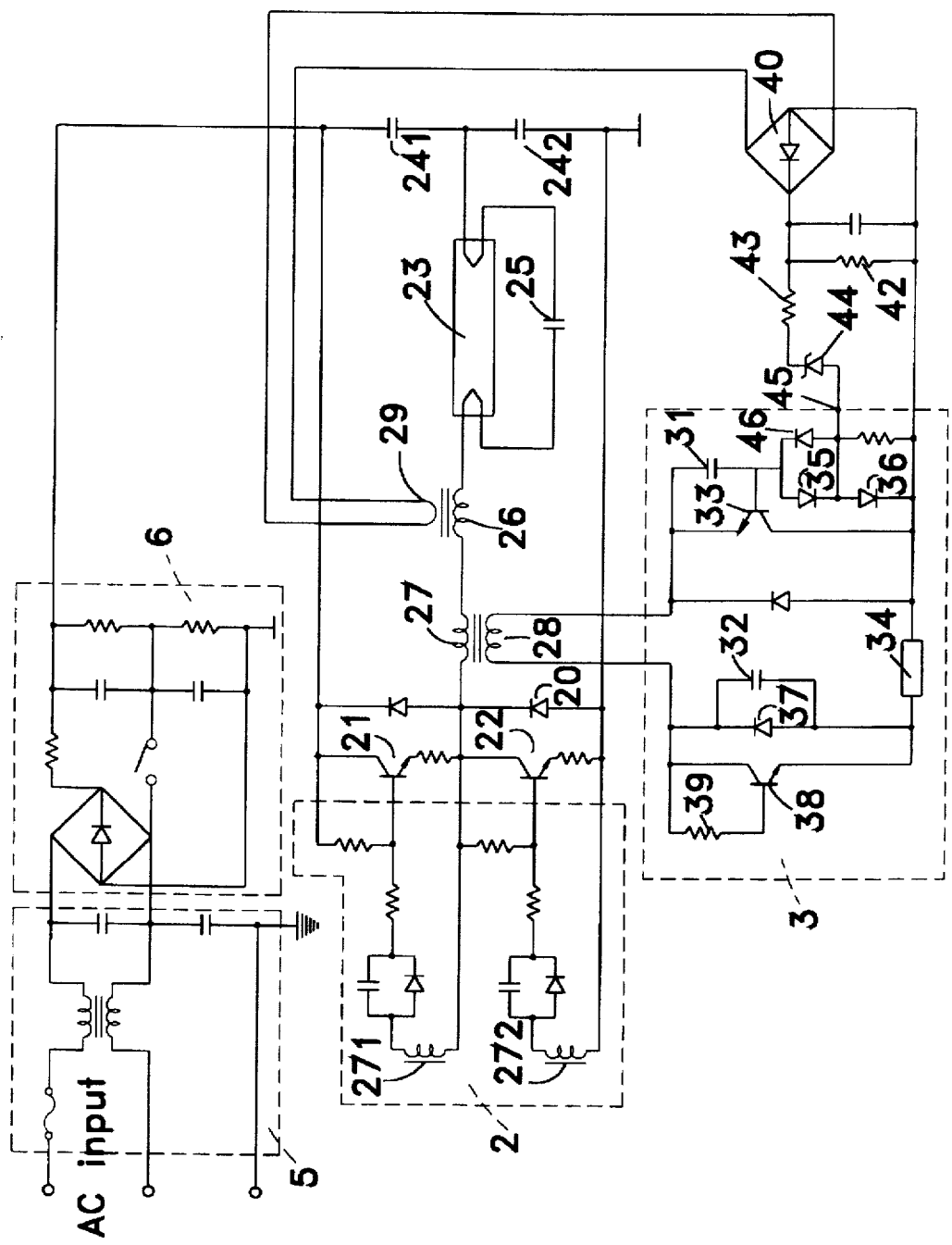
FIG. 4 is a detailed circuit diagram of the embodiment in FIG. 3.

FIG. 4 shows a typical example of an electronic stabilizer utilizing the above-described variable frequency soft start circuit 3. The circuit 3 comprises a protective and power factor improving circuit 5 for receiving electric currents supplied from the outside; a filtering and rectifying loop 6 for filtering and rectifying the power output from the protective and power factor improving circuit 5 and supplying the electronic stabilizer with the required power; a drive transformer 27 as described above for driving two secondary induction coils 271, 272 of opposite polarities in the high frequency switching control loop 2; and an LC oscillating circuit connected in a series by an inductor 26 and a plurality of capacitors 241, 242 and 25 to a fluorescent lamp 23. The high frequency switching loop 2 in the Figure controls a first transistor 21 and a second transistor 22. By means of two secondary induction coils 271 and 272, the first and the second transistors 21 and 22 are connected or disconnected at a different time to maintain sustained oscillation. The high frequency switching loop 2, working in cooperation with the LC oscillating current, supply energy to the fluorescent lamp 23.

As shown in FIG. 3, the operating principle of the loop according to the present invention is that the secondary coil 28 is coupled in the drive transformer 27 to supply electric currents required by the start circuit in the block represented by imaginary lines. Upon starting of the electronic stabilizer (see FIG. 4 for the start loop), as the start trigger loop is generally added to the base electrode of the transistor 22, the second transistor 22 will be connected first while the first transistor 21 will be cut off, so that a voltage Vcc=250 Vdc flows from a harmonic capacitor 241 via the capacitor 25, the fluorescent lamp 24, a harmonic inductor 26 and the drive transformer 27 to the second transistor 22, forming a charge pathway. At this time, the secondary coil 28 is supplied with an induced voltage, and the capacitors 31 and 32 are short-circuited simultaneously. Therefore, the primary transistor 33 is connected, and the beat core 34 and the secondary 28 are in a parallel state. Relatively, the total inductance of the drive transformer 27 will drop, and the overall operating frequency is set by the beat core 34 in a range higher than the normal operating frequency. In consequence, as the energy obtained by the fluorescent lamp 23 is little (based on the parallel harmony), the capacitor 31 may be charged gradually, so that the primary transistor 33 will enter a cut-off state. At this point, the starting of the entire system is completed. During the soft start operation, the drive transformer 27 itself also performs high frequency switching, only that its frequency may be subjected to the control of the circuit 3. Since the polarities of the transistors 21 and 22 are respectively connected to the drive transformer 27 are opposite, after the drive transformer 27 has switched to the other half cycle, the first transistor 21 will become connected while the second transistor 22 will be cut off. Therefore, the charge of the fluorescent lamp 23 will discharge through the first transistor 21, the drive transformer 27, the fluorescent lamp 23 and the capacitor 24. Plus another path through the capacitor 242, the diode 20, the drive transformer 27 and the inductor 29, there are formed two discharge paths. Such repetitive oscillation constitutes the high frequency electronic stabilizer capable of soft starting.

When power is off, the charge in the capacitor 31 requires a path for discharging. The path is as follows: from the capacitor 31 via the diodes 35 and 36, the beat core 34, the diode 37, the secondary transistor 38 (the resistor 39 supplying a forward bias voltage to the secondary transistor 38 at this point) and the secondary coil 28 back to the capacitor 31. The major function is to prepare for the next start, so that the stabilizer may quickly enter the state of soft start then. Therefore, it may be ensured that soft start electric currents may flow through the fluorescent lamp at every "on" or "off".

The present invention may also have another function. When the supplied power is unstable, a corresponding voltage may be induced by the inductor 29 and sent to a bridge rectifier 40 for rectification. The voltage is then filtered by the capacitor 41 and divided by the resistor 42, via the connection of a zener diode 44 and a contact 45, the output power may be stabilized. Therefore, even if the power supply is unstable, stable output power may be obtained by means of the feedback, so that the luminosity of the lamp may remain affected by unstable power supply and provides a stable light source.

Figure 5:
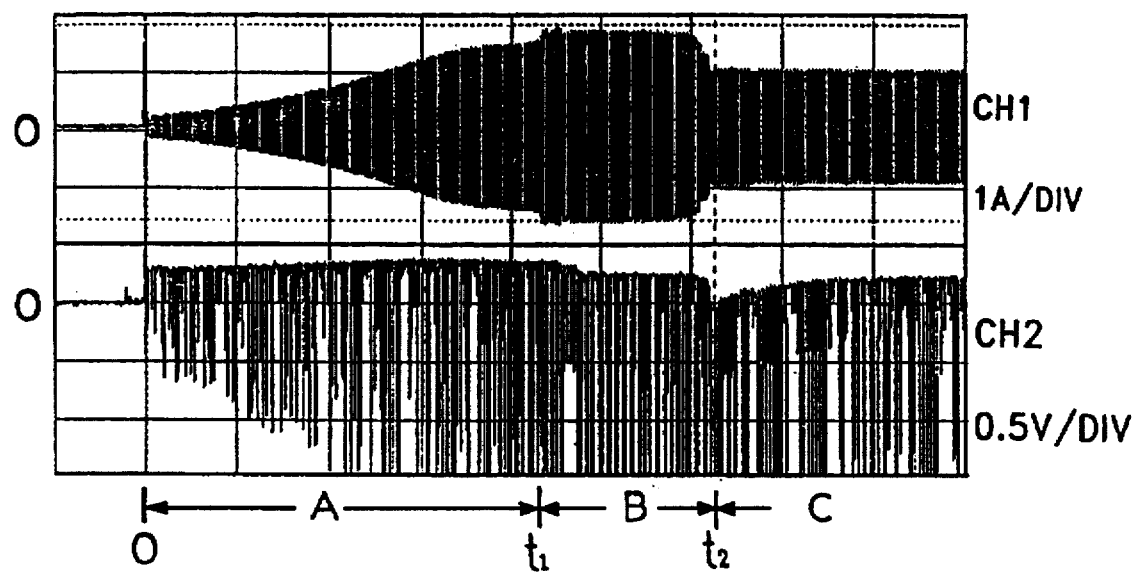
FIG. 5 is a comparative waveform diagram which shows the results of experimenting with the present invention, the results indicating the changes in the electric currents in the tube and the bias voltage of the transistors in the circuit to occur at the same time.
Figure 6:
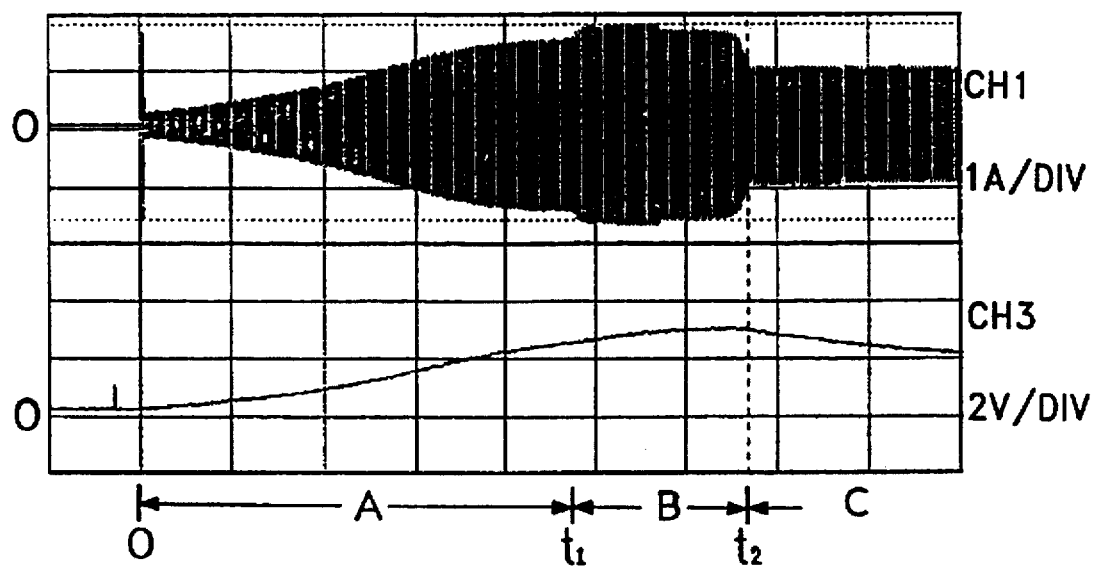
FIG. 6 is another comparative waveform diagram which also shows the results of experimenting with the present invention, the results indicating the changes in the electric currents in the tube and the voltages at the terminals of the capacitor in the circuit to occur at the same time.

Description of the present invention is next focused on the waveform diagrams in FIGS. 5 and 6. In the figures, CH1 (1A/DIV) represents the waveform of the electric currents of the fluorescent lamp, and CH2 (0.5A/DIV) is the waveform measured at the contact 45 in FIG. 3.

In a time zone A(0-t1), the primary transistor 33 in FIG. 3 is at the soft start stage. It can therefore be seen from the waveform CH1 that the electric currents of the fluorescent lamp increases gradually from a set minimum value to the time t1 when the primary transistor 33 is cut off. This soft start period A may be easily adjusted by changing the value of the capacitor 31. Compared to the forced control of the positive and negative half cycles in the prior art in which the resistance-capacitance (RC) time constant of the positive and negative half cycles must be adjusted, the present invention is evidently more simple. In the time zone B (t1-t2), it is shown that the primary transistor 33 has been cut off, and the preheating time for the fluorescent lamp has exceeded and is in an excited state. In the time zone C(t2), the fluorescent lamp is constantly in an arc discharging state.

In FIG. 6, it can likewise be seen that the voltage waveform CH3 at the terminals of the capacitor 31 exhibit the same effects. The relationship of the capacitor 31 to the start currents CH1 is illustrated below:

In the time zone A(0-t1), as the capacitor 31 is not fully charmed, the voltage induced at the secondary coil 28 flows from the capacitor 31 to supply a forward bias voltage to the primary transistor 33. At this point, the primary transistor 31 is connected and put in a soft start state. After the capacitor 31 has been gradually charged to the full until the time t1, the transistor 33 will be cut off since it cannot obtain adequate forward bias voltage, and the soft start operation is automatically completed at this point.

Referring to FIG. 4, it can be seen from the embodiment shown therein that the soft start circuit 3 according to the present invention is independent of the conventional electronic stabilizers. Therefore, all self-excited electronic stabilizers may be provided with the soft start circuit of the invention to achieve soft starts without the need to alter the circuit structure of the electronic stabilizers. This is an important feature of the present invention.

A sample of the electronic stabilizer according to the present invention has been experimented with fluorescent lamps in continuous and repeated on/off tests. During the tests, a specific voltage was input, and the lamp was switched on after about 25 minutes and switched off after about 30 minutes. The process was repeated for over 10000 times. The results are the filament remained intact and the stabilizer was in a normal state. The allowable switching times are much higher than the average allowable 2000 times in prior electronic stabilizers by 4 to 5 times. It is therefore evident that the present invention may effectively prolong the life of fluorescent lamps.

Although the present invention has been illustrated and described with reference to the preferred embodiments thereof, it should be understood that it is in no way limited to the details of such embodiments, but is capable of numerous modifications within the scope of the appended claims.

What is claimed is:

1. An electronic stabilizer with a variable frequency soft start circuit, comprising:

a protective and power factor improving circuit for receiving power supply from the outside;

a filtering and rectifying circuit for filtering and rectifying the power output from said protective and power factor improving circuit and then supplying the power required by said electronic stabilizer;

a drive transformer for driving two secondary induction coils of opposite polarities;

an LC oscillating circuit including an inductor and a plurality of capacitors connected in series and connected to a fluorescent lamp; and a high frequency switching control loop for controlling a first transistor and a second transistor which are connected or disconnected by means of said secondary induction coils so as to maintain sustained oscillation to cooperate with said LC oscillating circuit to supply the energy required by said fluorescent lamp for excitation; wherein said drive transformer has a secondary side having a secondary coil for supplying an induced voltage to a variable frequency soft start circuit;

said variable frequency soft start circuit comprises: an inductance element paralleled to said secondary coil;

a primary transistor provided at a charging side between said secondary coil and said inductance element and having a first capacitor connected to a base electrode of said primary transistor, whereby at the initial stage when said first transistor is connected and charges said fluorescent lamp, said first capacitor will immediately obtain the induced voltage and may, prior to being fully charged, supply a forward voltage to said primary transistor, so that said secondary coil paralleled to said inductance element may reduce the total inductance, and the operating frequency of said LC oscillating circuit may consequently increase to reduce the energy obtainable by said fluorescent lamp to achieve a soft start; and a secondary transistor provided at a discharging side between said secondary coil and said inductance element, said secondary transistor forming a discharge loop with said secondary coil, said first capacitor and said inductance element, said discharge loop having a plurality of diodes connected in series for discharging of said first capacitor.

2. An electronic stabilizer as claimed in claim 1, wherein said secondary transistor is paralleled to a diode and a capacitor.

3. An electronic stabilizer as claimed in claim 1, wherein said inductance element is a beat core.

4. An electronic stabilizer as claimed in claim 1, wherein said LC oscillating circuit has an inductance, and said inductance has a secondary side coupled to a filtering and rectifying circuit.

5. A variable frequency soft start variable circuit for connecting to an electronic stabilizer to improve the efficiency of the initial starting, said circuit comprising:

a secondary coil coupled to a drive transformer of said electronic stabilizer for obtaining an induced voltage;

an inductance element paralleled to said secondary coil;

a primary transistor provided at a charging side between said secondary coil and said inductance element, a first capacitor being connected to a base electrode of said primary transistor so that at the initial stage when said first transistor is connected and charges a fluorescent lamp, said first capacitor will immediately obtain the induced voltage prior to being fully charged and supply a forward voltage so that said secondary coil paralleled to said inductance element may reduce the total inductance, and the operating frequency of said LC oscillating circuit may consequently increase to reduce the energy obtainable by said fluorescent lamp to achieve a soft start; and a secondary transistor provided at a discharging side between said secondary coil and said inductance element, said secondary transistor forming a discharge loop with said secondary coil, said first capacitor and said inductance element, said discharge loop having a plurality of diodes connected in series for discharging of said first capacitor.

6. An electronic stabilizer as claimed in claim 5, wherein said secondary transistor is paralleled to a diode and a capacitor.

7. An electronic stabilizer as claimed in claim 5, said inductance element is a beat core.

* * * * *